United States Patent Office 3,380,464
Patented Apr. 30, 1968

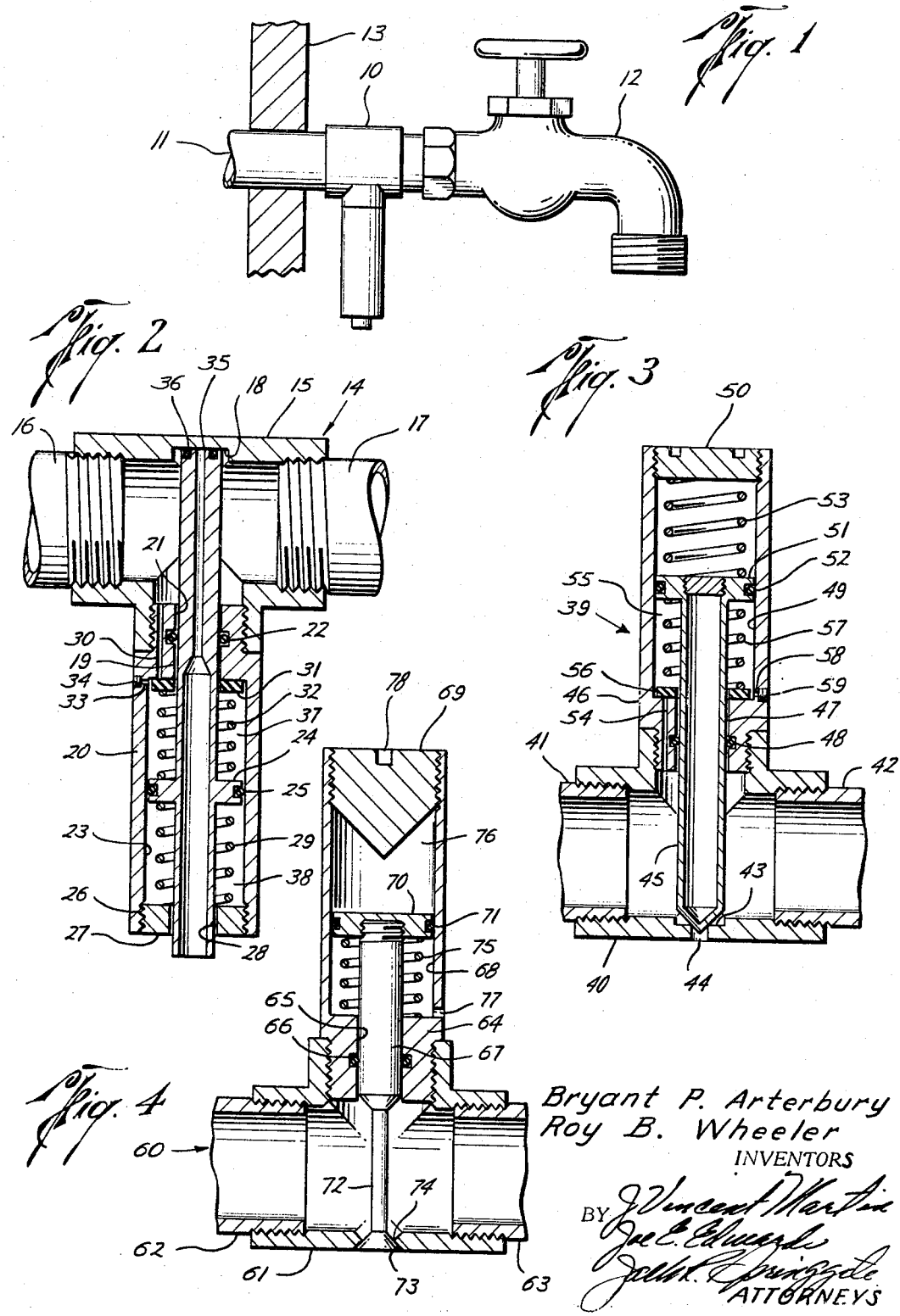

3,380,464
THERMOSTATIC FREEZING VALVE
Bryant P. Arterbury and Roy B. Wheeler, Houston,
Tex., assignors of one-third to Roy L. Arterbury,
Houston, Tex.
Filed Apr. 8, 1965, Ser. No. 446,584
4 Claims. (Cl. 137—60)

ABSTRACT OF THE DISCLOSURE

A temperature responsive valve adapted to be installed in a water line to protect against freezing which opens a bleed opening responsive to freezing of water in the valve actuator to provide a flow of water in the water line whereby freezing of water in the line is prevented.

The present invention relates to a temperature-responsive valve. In particular, the present device relates to a temperature-responsive valve which bleeds water from water lines when there is a danger of the water in the lines freezing.

Prior to the present invention many devices have been used to prevent water from freezing in the water pipes including temperature-actuated valves which open the lines to drain the lines completely. Other devices have included means for heating the lines responsive to a thermostatic element. None of these devices were made to respond to an actual freezing of the water. Therefore, an object of the present invention is to provide a temperature-responsive valve for connection into a water line, which valve responsive to the freezing of water in a chamber will bleed water from the line to prevent the water in the line from freezing.

Another object of the present invention is to provide a temperature-responsive valve which opens responsive to freezing of water in a chamber in the valve to allow water to flow from the water line in small quantities.

A further object of the present invention is to provide a temperature-responsive valve for the protection of water lines from freezing which bleeds water from the lines until the danger of freezing is overcome and thereafter shuts off the bleeding of the water.

A still further object of the present invention is to provide a valve to protect water lines from freezing, which valve opens a bleed connection for short periods of time to bleed the water from the lines and thereby prevent freezing of the water in the lines.

Still another object of the present invention is to provide a valve responsive to freezing of water to open a bleed in a water line when the water in the line is in danger of freezing whereby the warmer water from buried water mains flows into the line and said device closes said bleed responsive to the heating by the warmer water in the line.

A still further object of the present invention is to provide a bleed valve for a water line having a water chamber in intimate heat exchange with the environment of the water line whereby the water in the chamber will freeze immediately before the water in the line freezes to thereby bleed water from the line whereby warmer water is drawn into the line and such warmer water is brought into heat exchange relationship to the ice in said chamber to melt the ice and thereby shut off the bleeding of the line.

Still a further object of the present invention is to provide a bleed valve device to prevent water from freezing in water lines wherein the device includes a temperature-responsive chamber which is in intimate heat exchange relation to the environment of said water lines and with the water contained within said water lines.

These and other objects of the present invention are hereinafter more fully described and explained in relation to the drawings wherein:

FIGURE 1 is an elevation view of an outdoor water faucet illustrating the installation of the valve device of the present invention connected into the water line leading to the outdoor faucet.

FIGURE 2 is a detail sectional view of the preferred form of the device of the present invention.

FIGURE 3 is a detail sectional view of a modified form of valve device of the present invention.

FIGURE 4 is a detail sectional view of another form of the valve device of the present invention.

Referring more in detail to the drawings, the valve 10 of the present invention is shown connected in the line 11 leading to the outside faucet 12. The wall 13 of the building, or home, is shown schematically in section to indicate that the line 11 extends therethrough.

The temperature-responsive valve 14 illustrated in FIG-URE 2 is provided with a T body 15 into which the pipes 16 and 17 of a water system are connected. While as shown in FIGURES 1 and 2 the connection of the pipes 16 and 17 indicate the central T connection to be extending downwardly, such connection is not the only way in which the valve of the present invention may be installed. The valve 10 could be connected to the outlet of faucet 12 and be provided with a suitable plug (not shown) closing its other threaded connection whereby the bleeding of water from the lines will be accomplished with the faucet 12 open.

The interior of the T 15, as shown in FIGURE 2, is recessed as at 18 to provide a valve seat for the valve member 19 which is hereinafter more fully described. The cylinder member 20 is provided with suitable threads for engagement in the central opening of the T body 15. If desired, member 20 can be made integral with the T 15. The upper end of cylinder member 20 is provided with a bore 21 through which valve member 19 extends. O-ring 22, positioned in a groove in the cylinder member 20 as shown, provides a seal between the bore 21 and the valve member 19. The remaining portion of the cylinder member 20 is counterbored at 23. Valve member 19 is provided with piston 24 integral therewith which is positioned in the counterbore 23. The exterior of the piston 24 is provided with a groove receiving the O-ring 25. The O-ring 25 seals between the exterior of the piston 24 and the wall of the counterbore 23. The wall at the lower end of counterbore 23 is threaded as at 26 and the plug 27 is threadedly engaged therein. The plug 27 is provided with a central bore 28 larger than the diameter of the valve member 19 which extends therethrough. The plug 27 provides a shoulder for the spring 29 which is compressed between the upper surface of the plug 27 and the lower surface of the piston 24.

Orifice 30 extends through the upper portion of the cylinder member 20 providing communication between the interior of the T body 15 and the interior of the counterbore 23 in the lower portion of the cylinder member 20. A relatively thin resilient washer 31 is positioned in the uppermost portion of the counterbore 23 and held therein by the spring 32. The spring 32 is positioned between the washer 31 and the upper surface of the piston 24. A fill connection 33 extends through the wall of cylinder member 20 and connects into the upper portion of counterbore 23. Plug 34 is positioned in the fill connection 33 to provide a sealed closure therefor.

It should be noted that while the springs 29 and 32 are illustrated being substantially similar, the spring 29 is intended to be a power spring of considerable force relative to the force exerted by the spring 32 since the spring 29 resists the opening movement of the valve member 19. The spring 32 functions only to maintain the washer 31 in position closing the lower end of the orifice 30. The washer 31 will therefore act as a check valve to prevent the flow of water from counterbore 23 into T body 15.

The upper end of the valve member 19 is provided with a relatively small opening 35 surrounded by an O-ring 36. The remaining portion of the valve member 19 is hollow, as shown, and provides a passageway for the flow of water therethrough when the valve member 19 is unseated.

The counterbore 23 being closed by the plug 27 is divided by the piston 24 into an upper chamber 37 and a lower chamber 38. In accordance with the principles of the present invention, the upper chamber 37 is filled with water and the lower chamber 38 is open to the atmosphere through the opening between the bore 28 and the exterior of the portion of the valve member 19 which extends through the bore 28 and the plug 27. It is believed desirable that the portion of cylinder member 20 surrounding chamber 37 should be relatively thin and of a material to provide a high coefficient of heat transfer between the interior of the chamber 37 and the exterior of the cylinder member 20.

In operation the temperature-responsive valve 14 will be installed in the water lines connecting to the pipes 16 and 17 as shown. During all normal conditions the components will be positioned as shown in FIGURE 2. Whenever the temperature to which the lines are exposed approaches freezing, the temperature of the water in the chamber 37 will also approach freezing and, by virtue of the relatively thin wall and its high rate of heat transfer, the water in chamber 37 will freeze before the water in the pipes 16 and 17 and the T body 15 will freeze. As can be seen, when the water in chamber 37 freezes, the expansion will create a force on the upper surface of the piston 24 which will move the valve member 19 downwardly unseating the O-ring 36 from the recess 18 and allowing water to flow from the interior of the T body 15 through the opening 35 and out through the interior of the valve member 19. The force of the freezing is contained in chamber 37 by the two O-rings 22 and 25 and by washer 31. This contained force resulting from freezing therefore is exerted on piston 24 and moves valve member 19 as explained.

In most cases after some water has been bled from the line, as hereinbefore described, the temperature of the water in the lines will increase. This increase in temperature of the water flowing down the interior of the valve member 19 will, by heat exchange through the wall of the valve member 19, heat the ice and water in the chamber 37. When the ice in chamber 37 melts, the force of the spring 29 will cause the valve member 19 to move upwardly until O-ring 36 seats in the recess 18 thereby shutting off the flow of the water through the opening 35.

It is preferred that the valve member 19 be made from a material having good heat exchange characteristics and further that the wall thickness of the valve member 19, particularly in the area exposed to the chamber 37, be sufficiently thin to provide a high coefficient of heat transfer to allow the water flowing downwardly therethrough to heat the ice and water in the chamber 37. The efficiency of this heat exchange is important to limit excessive bleeding of the water from the lines at a time when the water in the lines is no longer in danger of freezing. It should be noted that after the valve has been opened to bleed water from the lines and thereafter closes, as hereinbefore described, it is again positioned to operate responsive to temperatures and will provide protection against the freezing of the water in the lines while limiting the amount of water bled from the lines.

The temperature-responsive valve 39, illustrated in FIGURE 3, is provided with a T body 40 into which the pipes 41 and 42 connect to provide the connection of the device into the water lines to be protected. The side of the T body 40 opposite the central connection is provided with a recess 43 and an orifice 44 extending through the wall of the T body 40. Valve member 45 is shown to be hollow but could be solid if desired. The valve member 45 extends through the cylinder member 46 and seats in position in the recess 43 closing the orifice 44. As shown, the cylinder member 46 is threaded into the central opening of the T body 40 and provided with a bore 47 having an O-ring 48 therein to seal against the exterior of the valve member 45. The upper portion of the cylinder member 46 is provided with counterbore 49. The upper end of the counterbore 49 is provided with threads to receive the plug 50. The upper end of the valve member 45 is provided with the piston 51. The O-ring 52 is positioned in a groove in the outer edge of the piston 51 and seals between the exterior of the piston 51 and the interior of the counterbore 49. The spring 53 is positioned within the counterbore 49 between the upper surface of the piston 51 and the lower surface of the plug 50 to urge the valve member 45 in a direction to seat in the recess 43 closing the orifice 44.

An orifice 54 extends through the lower portion of the cylinder member 46 and provides a connection between the interior of the T body 40 and the interior of the chamber 55 surrounding the valve member 45 and defined by the counterbore 49 and the lower side of the piston 51. A relatively thin resilient washer 56 is poistioned in the lower end of the counterbore 49 and provides a seal for the orifice 54. The washer 56 is urged into sealing position by the spring 57 which is positioned above the orifice 56 and engages the underside of the piston 51. A suitable connection 58 extends through the wall of cylinder member 46 into the chamber 55 and is closed by the plug 59.

In operation, the chamber 55 will be filled with water and when the water in the chamber 55 begins to freeze responsive to freezing temperature to which the water lines 41 and 42 are exposed, the expansion of the water forming ice will exert a force upwardly on the lower side of the piston 51 causing valve member 45 to be moved upwardly. The upward movement of the valve member 45 will unseat valve member 45 from the recess 43 and thereby open the orifice 44 to allow water in the lines 41 and 42 in the T body 40 to be bled out through the orifice 44. It should be noted that the wall of cylinder member 46 immediately surrounding the chamber 55 should be of a material that is a good heat conductor and of sufficient thinness to provide a rapid and efficient heat transfer therethrough. Also, valve member 45 is preferably made from a material having good heat conducting characteristics and is preferably hollow to assist in conducting heat of the water within the T body 40 to the area of valve member 45 surrounded by the chamber 55. If valve member 45 is solid, the heat transfer will be slower but some heat will still be conducted. Thus, it can be seen when sufficient water has been bled from the lines through the orifice 44 to raise the temperature of the water in the lines, this increase in temperature will be transmitted through the valve member 45 and will heat the ice and water in the chamber 55. When the ice in chamber 55 melts, the force of the spring 53 will move the valve member 45 downwardly into position closing the orifice 44 and thereby shutting off the bleeding of water from the lines.

The temperature-responsive valve 60 in FIGURE 4 includes a T body 61 into which the lines 62 and 63 are threadedly engaged and is provided with a cylinder member 64 threadedly engaging into the central opening of the T body 61. The cylinder member 64 is provided with a bore 65 in which O-ring 66 is positioned in a groove to seal against the exterior of the upper portion of the valve member 67. The upper portion of the cylinder member 64 is provided with a counterbore 68 substantially larger than the bore 65 and being internally threaded to the upper end to receive the plug 69. Valve member 67 has the piston 70 secured to its upper end. O-ring 71 is positioned in a groove around the exterior of the piston 70 and provides a seal between the piston and the interior of the counterbore 68. Valve member 67 also includes the stem 72 which extends downwardly and seats in the seat 73 on the exterior of the T body 61 surrounding the port 74. As is shown in FIGURE 4, the port 74 is diametrically opposite and in line with the bore 65 through the cylinder member 64. The spring 75 is positioned in the lower portion of counterbore 68 and engages the underside of the piston 70 and the force of the spring 75 urges the valve member 67 in upwardly. Piston 70, plug 67 and counterbore 68 define the chamber 76 which is filled with water.

It should be noted that the vent 77 extends through the wall of cylinder member 64 into the lower portion of counterbore 68. Plug 69 should be provided with suitable means 78, such as a slot or projection, for the unscrewing of the plug 69 from the end of the cylinder member 64.

When the temperature of the air surrounding the pipes 62 and 63 drops to a point where the water is approaching a freezing condition, the water in the chamber 76 will commence freezing. The freezing of the water in the chamber 76 will create a force on the upper portion of piston 70 which will overcome the force of the spring 75 and move valve member 67 downwardly whereby the end of stem 72 will move from seat 73 thereby opening port 74. The opening of port 74 will allow water to bleed from the interior of T body 61 so long as the force created by the freezing of the water in the chamber 76 is sufficient to withstand the force of spring 75. When the water flowing in body 61 becomes warm, a small amount of heat transfer will occur whereby if external cooling ceases, any ice formed in chamber 76 may be melted and thereby allow spring 75 to move piston 70 and thereby close port 74 to stop the water bleeding.

The forms of the present invention illustrated all provide a temperature-responsive valve which, when connected into water lines, will bleed water from such lines to prevent freezing of the water in such lines. The actuation of the valves of the present invention is made responsive to the freezing of water in a water chamber which is exposed to the same environment as the water pipes being protected, but such water chamber has a high coefficient of heat transfer so that the water in the chamber will freeze before the water in the water lines freezes. While the bleeding of water from water lines is sufficient to prevent freezing of the water in the lines, a continuous bleeding is not generally necessary for this purpose. Therefore, to allow the valve to close and shut off the continued bleeding when not necessary, a heat exchange between the water in the water lines and the water chamber is provided. With such heat exchange, when the water in the water pipes becomes sufficiently warm as to not be in danger of freezing, this warm water heats the water chamber to melt the ice formed therein and thereby closes the valve to shut off the flow of water bleeding therethrough. The form of the invention illustrated in FIGURE 2 is especially advantageous since the water being discharged is conducted through the interior of the valve member and will thereby be in direct heat exchange relationship to the inner wall of the water chamber. This relationship allows the valve to be closed in as short a period as possible after the water in the lines is no longer in danger of freezing.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A temperature responsive valve comprising,
 a body defining a water passageway therethrough,
 a bleed opening providing communication between said body passageway and the exterior of said body,
 a water-filled chamber responsive to ambient temperature conditions,
 a valve member extending through said water-filled chamber controlling flow of water through said bleed opening, and
 a valve actuator in said chamber and operatively connected to said valve member to open and close said bleed opening,
 said valve actuator being responsive to freezing of water in said chamber whereby said valve member opens said bleed opening when water in said chamber freezes to thereby prevent freezing of water in said body,
 said bleed opening extending through said valve member whereby upon opening of said bleed opening the water within said body will flow through said valve member and be in heat exchange relationship through the walls of said valve member with said water-filled chamber to warm said chamber when the water in said body is warmed.

2. A temperature responsive valve according to claim 1 including
 a fill passage communicating between the interior of said body and said chamber, and
 check valve means preventing flow of water from said chamber to said body and allowing flow from said body to said chamber to assure that said chamber is filled with water.

3. A temperature responsive valve according to claim 2 wherein said check valve means includes
 a resilient washer adapted to close the chamber side of said fill passage, and
 spring means urging said washer into position closing said fill passage,
 the force exerted by said spring means being sufficiently light to allow movement of said washer whenever water pressure in said body exceeds the pressure in said chamber whereby water may flow into said chamber whenever it is incompletely filled.

4. A temperature responsive valve comprising,
 a body defining a water passageway therethrough,
 a bleed opening extending through said body and providing communication between said body passageway and the exterior of said body,
 a water-filled chamber responsive to ambient temperature conditions,
 a valve member controlling flow of water through said bleed opening, and
 a valve actuator in said chamber and operatively connected to said valve member to open and close said bleed opening,
 said valve actuator being responsive to freezing of water in said chamber whereby said valve member opens said bleed opening when water in said chamber freezes to thereby prevent freezing of water in said body,
 said valve member extending through said body and said water-filled chamber to open and close said bleed opening whereby said valve member provides heat exchange relationship between the water in said body and the water in said chamber.

(References on following page)

References Cited

UNITED STATES PATENTS

| | | | |
|---|---|---|---|
| 956,062 | 4/1910 | Fell | 165—71 XR |
| 1,526,718 | 2/1925 | Opp | 137—60 XR |
| 1,916,038 | 6/1933 | Cartwright | 137—62 XR |
| 3,047,050 | 7/1962 | Sourber | 251—145 XR |

FOREIGN PATENTS

| | | |
|---|---|---|
| 341,853 | 1921 | Germany. |
| 372,965 | 1923 | Germany. |
| 522,648 | 1931 | Germany. |

WILLIAM F. O'DEA, *Primary Examiner.*

R. GERARD, *Assistant Examiner.*